(No Model.)
J. KENNEDY.
PUMP VALVE.
No. 491,286. Patented Feb. 7, 1893.
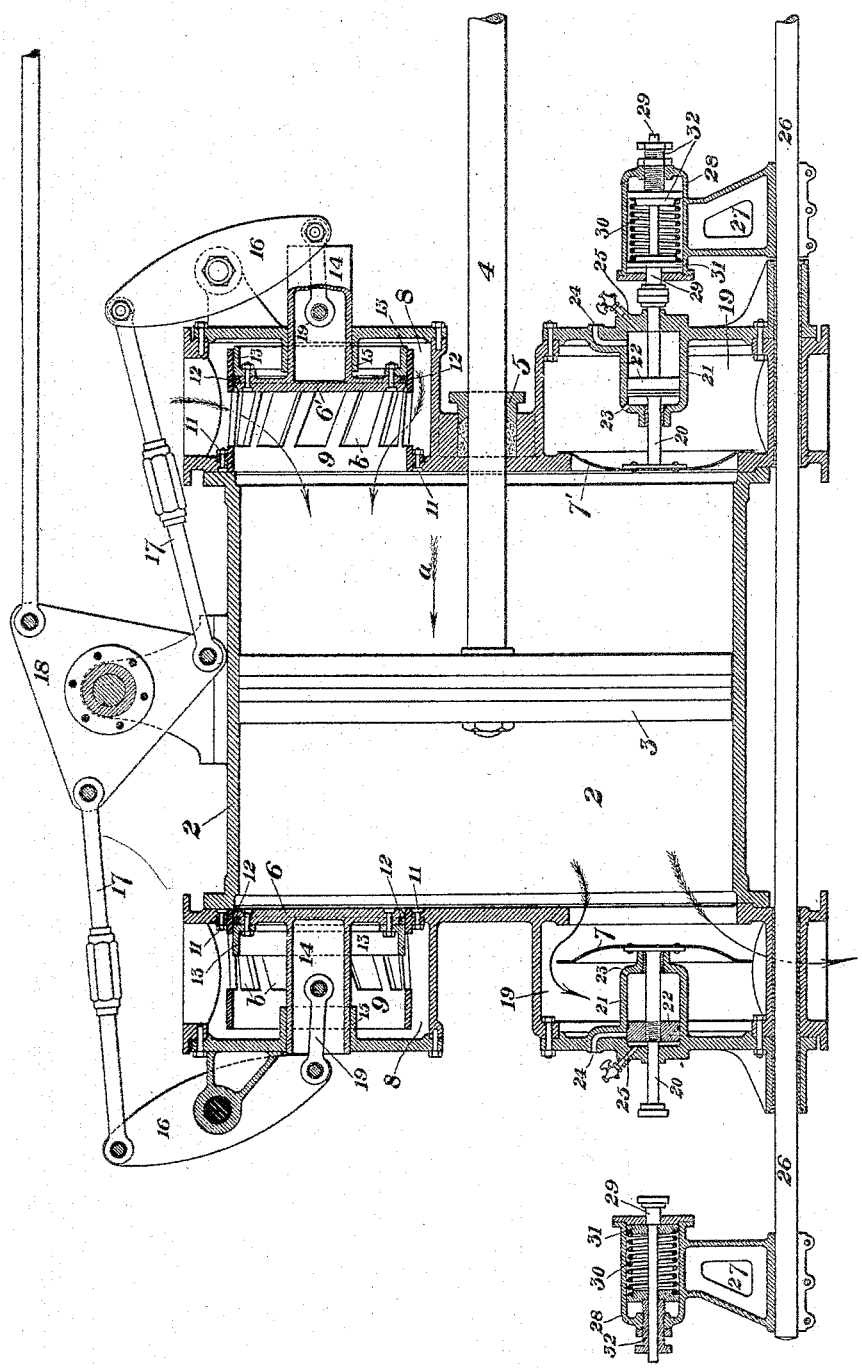
WITNESSES.
INVENTOR.
Julian Kennedy
by W. Bakewell & Sons
his Attorneys

UNITED STATES PATENT OFFICE.

JULIAN KENNEDY, OF LATROBE, PENNSYLVANIA.

PUMP-VALVE.

SPECIFICATION forming part of Letters Patent No. 491,286, dated February 7, 1893.

Application filed February 24, 1891. Serial No. 382,459. (No model.)

*To all whom it may concern:*

Be it known that I, JULIAN KENNEDY, of Latrobe, in the county of Westmoreland and State of Pennsylvania, have invented a new and useful Improvement in Pump-Valves, of which the following is a full, clear, and exact description, reference being had to the accompanying drawing, which shows in vertical longitudinal section the cylinder of a pneumatic blowing-engine provided with my improved valves and valve-actuating mechanism.

My invention relates to improvements both in inlet and outlet valves for pneumatic blowing-engines or pumps for elastic fluids.

In the drawing, 2 represents the pump-cylinder.

3 is the piston which reciprocates therein and is actuated by a suitable engine from which the power is transmitted to the piston-rod 4, which works through an ordinary stuffing-box 5. At each end of the cylinder is an inlet-valve 6, 6', and an outlet-valve 7, 7', through which air or other elastic fluid is admitted and expelled.

The pump shown in the drawing is especially adapted for use as a blowing engine for blast-furnaces, converters, &c., though it may be used for other purposes, and my valves may be applied to the cylinders of pumps or blowing engines differently constructed.

In the operation of the device, as the piston recedes from an end of the cylinder, the inlet valve at that end is opened and the outlet valve is closed, while at the other end of the cylinder, during the approach of the piston, the inlet valve is closed and the outlet valve opened.

I shall now describe particularly the construction and operation of the valves:

First. *The inlet valves.*—8, 8, are chambers at the ends of the cylinder, preferably made integral with the cylinder heads, in which the valves operate. Within each of these chambers is set removably a cylindrical cage 9, having lateral openings *b* for the admission of air (or other fluid to be pumped), and at its inner end opening into the cylinder, at the head thereof. To secure these cages removably in place I may provide them at their inner ends with peripheral flanges, affording means for securing them by bolts 11 to the cylinder head. Each of the valves 6, 6' is a piston valve, consisting preferably of a circular disk having a peripheral packing-ring 12, and rearwardly-extending annular flange 13, which works within the cylindrical cage 9, and serves to guide the valve therein. The flange may be made of a piece separate from the valve-disk and secured thereto by bolts, thus serving the additional function of retaining the packing-ring in place. A hollow trunk 14 projects rearwardly from the valve-disk through a correspondingly shaped guide socket 15 at the end of the chamber 8. The valves are reciprocated oppositely to each other by levers 16, connected with the interior of the trunks 14 by links 19 and connected by pitmen 17 with a rocking-lever 18, which is operated by connection with an eccentric or similar device actuated by the moving parts of the driving-engine. The operating mechanism is so arranged and timed that at the beginning of each stroke of the piston the valve back of the piston shall be moved back so as to expose the openings *b* and to admit air therethrough into the cylinder, while the valve in advance of the piston is moved inwardly to a position past the openings *b* substantially flush with the end of the cylinder, so as to cut off communication between the cylinder and said openings. In the drawing the piston is moved in the direction of the arrow *a*, the valve 6' is open, and the valve 6 is closed. This valve 6 illustrates the fact that the valve when closed affords little or no clearance space at the end of the cylinder. The use of the trunk 14 is also desirable in that it serves as a guide for the valve, and by affording interior space for the link 19 enables the lever 16 to be set close to the end of the valve-chamber. The use of the detachable cage 9 is of advantage in that it affords facilities for removal and repair or replacement when worn.

Second. *The outlet valves.*—The outlet valves 7, 7 are claimed generically in a patent application Serial No. 375,809, filed by me on December 26, 1890, in which they are claimed as a modification of the mechanism therein described. I intend to claim said valves specifically in the present case. 19, 19, are chambers in which the valves are set and from which outlet-pipes lead to the reservoir or other place where the air blast is utilized. The valves themselves consist of disks constructed and arranged to move to and from their seats around the opening between the cylinder and the valve-chambers. Each valve has a stem 20, which extends through a small cylinder 21 in which it is provided with a piston 22. The cylinder 21 has a hole 23 opening into the chamber 19, and holes 24, 25 opening into the external atmosphere. The stem 20 projects to the exterior of the cylinder 21, and is adapted to be moved inwardly by means of a tappet fixed to a rod 26 which is reciprocated longitudinally by connection with an eccentric on the engine. This tappet is constructed as follows:—A bracket 27 is fixed to the rod 26 and is provided with a hollow case 28, through the front of which passes a rod 29. A spring 30 bears at one end on a collar 31 on said rod, and at the other end bears against the head of a screw 32, by means of which the tension of the spring is regulable. The head of the rod 29 projects to the front of the case 28 and is adapted to engage the rear end of the stem 20, and to serve as a tappet therefor. Each of the valves 7, 7', may be provided with mechanism constructed as described above, the tappet mechanism of both being carried by the reciprocating rod 26, so that in the opposite motion of said rod the tappets shall engage alternately the valve stems. In the drawing I show the valve 7 open, to permit the approaching piston to force the air through the chamber 19 into the outlet pipe. When the piston reaches the end of its stroke, the tappet engages the valve-stem and forces the valve inwardly to its seat. The mechanism which actuates the rod 26 is timed, so that the stem shall be engaged and the valve seated before the rod reaches the end of its stroke, and during the remainder of its stroke the pressure on the valve-stem is taken up by compression of the spring 30. I am enabled by this construction to secure accuracy in operation of the valve and to insure certainty in its seating. This is illustrated in connection with the valve 7'. During the reverse motion of the piston 3, the valve 7 is kept seated by back pressure of the air on it, and the other valve toward which the piston approaches is opened at about the time when the internal pressure of air in the cylinder becomes equal to the back pressure of air in the outlet pipe or reservoir. At this moment the valve lifts from the seat, and the air which has access to the cylinder 21 through the hole 23, acts on the piston 22 and moves it outwardly, thereby withdrawing the valve entirely from its seat by means auxiliary to the action of the air current through the valve-port and preventing the fluttering which results when such current alone is used to open the valve. Near the end of the outstroke of the piston 22, it closes the outlet 24, so that the air in advance of it can escape only through the constricted opening 25. The cylinder thus acts as a dash-pot in cushioning the action of the piston.

Without limiting myself precisely to the described arrangement and construction of the parts as hereinbefore described, I claim:—

1. In a pump, the combination with the cylinder and reciprocating piston, of an inlet valve chamber situate at the head of the cylinder, a piston-valve adapted to reciprocate therein to and from the cylinder to open and close communication therewith, said valve having a hollow trunk, a link extending into the trunk and a lever connecting the valve with the operating mechanism; substantially as and for the purposes described.

2. In a pump, the combination with valves situate at opposite ends of the pump-cylinder and having projecting stems, of a reciprocating rod having spring-backed tappets, adapted to engage the stems and to close the valves; substantially as and for the purposes described.

3. In a pump, the combination of a valve, positively-acting mechanism for closing it, and an auxiliary-opening cylinder having a piston connected with the valve-stem, said cylinder being in communication with the pump-cylinder or valve-chamber and deriving therefrom its motive fluid, and provided with properly arranged outlets on the outer end of said auxiliary cylinder, to enable it to bring the piston to rest gradually without shock; substantially as and for the purposes described.

In testimony whereof I have hereunto set my hand this 19th day of February, A. D. 1891.

JULIAN KENNEDY.

Witnesses:
W. B. CORWIN,
H. M. CORWIN.